United States Patent
Hirth

(10) Patent No.: US 9,294,370 B2
(45) Date of Patent: Mar. 22, 2016

(54) SYSTEM AND METHOD FOR REDUCED LATENCY REPORTING IN AN ETHERNET PASSIVE OPTICAL NETWORK (EPON)

(71) Applicant: Broadcom Corporation, Irvine, CA (US)

(72) Inventor: Ryan Edgar Hirth, San Francisco, CA (US)

(73) Assignee: BROADCOM CORPORATION, Irvine, CA (US)

(*) Notice: Subject to any disclaimer, the term of this patent is extended or adjusted under 35 U.S.C. 154(b) by 138 days.

(21) Appl. No.: 14/105,234

(22) Filed: Dec. 13, 2013

(65) Prior Publication Data

US 2015/0163107 A1  Jun. 11, 2015

Related U.S. Application Data

(60) Provisional application No. 61/912,649, filed on Dec. 6, 2013.

(51) Int. Cl.
| | |
|---|---|
| *H04J 3/16* | (2006.01) |
| *H04L 12/26* | (2006.01) |
| *H04L 12/24* | (2006.01) |
| *H04Q 11/00* | (2006.01) |

(52) U.S. Cl.
CPC .......... *H04L 43/062* (2013.01); *H04L 41/0896* (2013.01); *H04Q 11/0071* (2013.01)

(58) Field of Classification Search
None
See application file for complete search history.

(56) References Cited

U.S. PATENT DOCUMENTS

| | | | | |
|---|---|---|---|---|
| 2011/0032948 | A1* | 2/2011 | Yu et al. | 370/442 |
| 2013/0239165 | A1* | 9/2013 | Garavaglia et al. | 725/129 |
| 2013/0272703 | A1* | 10/2013 | Fang et al. | 398/58 |
| 2014/0133859 | A1* | 5/2014 | Fang et al. | 398/76 |
| 2014/0178076 | A1* | 6/2014 | Fang et al. | 398/98 |
| 2015/0104173 | A1* | 4/2015 | Sun et al. | 398/67 |

\* cited by examiner

*Primary Examiner* — Michael J Moore, Jr.
(74) *Attorney, Agent, or Firm* — Foley & Lardner LLP

(57) ABSTRACT

A system and method for reduced latency reporting in an Ethernet passive optical network (EPON). Gate messages can be generated by a bridged fiber coax unit (FCU) in response to a first report message from a coax network unit (CNU). A second report message including a request for bandwidth can be transmitted to the optical line terminal (OLT) prior to receipt of upstream data at the FCU.

23 Claims, 4 Drawing Sheets

SYSTEM AND METHOD FOR REDUCED LATENCY REPORTING IN AN ETHERNET PASSIVE OPTICAL NETWORK (EPON)

This application claims priority to provisional application No. 61/912,649, filed Dec. 6, 2013, which is incorporated herein by reference in its entirety.

BACKGROUND

1. Field of the Invention

The present invention relates generally to multipoint control protocols and, more particularly, to a system and method for reduced latency reporting in an Ethernet passive optical network (EPON).

2. Introduction

In a point-to-multipoint system such as an Ethernet passive optical network (EPON), a single optical line terminal (OLT) at a head end can be designed to communicate with a plurality of optical network units (ONUs) at various end nodes. This arrangement leverages a shared fiber optic plant by multiple networking nodes.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
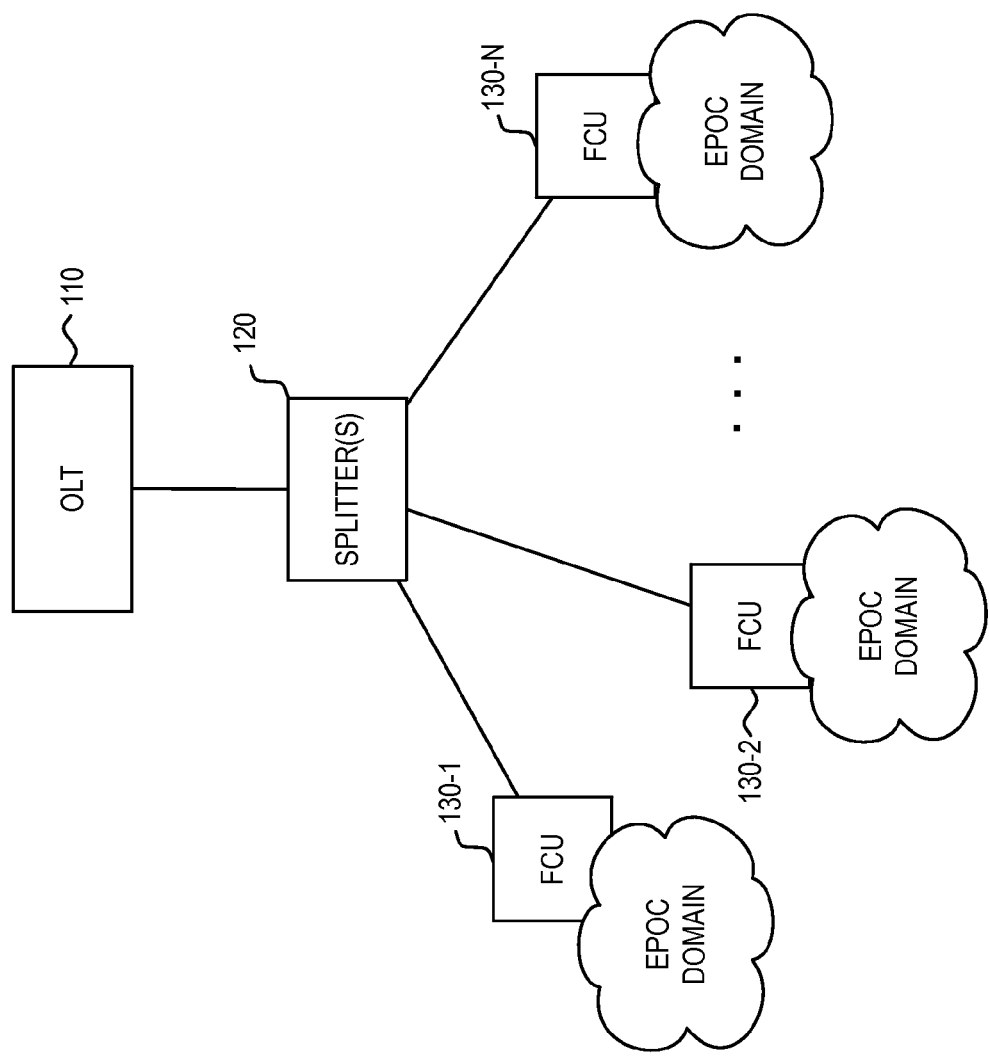
FIG. 1 illustrates an example of a point-to-multipoint communication network that incorporates network devices of the present invention.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

EPON uses dynamic bandwidth allocation (DBA) to allocate upstream bandwidth between ONUs and an OLT. In this process, an ONU would transmit a report message upstream to the OLT when the ONU has data to send. In response, the OLT would transmit a gate message downstream to the ONU when the OLT determines to grant the upstream bandwidth. Ethernet passive optical network over coaxial (EPOC) follows the same protocol over a cable network instead of the fiber network.

In a bridged network of EPON and EPoC that combines both an optical and coaxial cable segments, the DBA latency is doubled since the coax network unit (CNU) first requests bandwidth from the fiber coax unit (FCU). Upon receipt of data at the FCU upon completion of the DBA process between the FCU and CNU, the FCU would then request bandwidth from the OLT in a second DBA process. It is recognized by the present invention that the sequential DBA processes between the FCU and the ONU, as well as the OLT and the FCU, increases traffic latency on the network to undesirable levels.

In accordance with the present invention, a method performed by an FCU is provided, which includes receiving, by the FCU via a coaxial cable, a first report message from a CNU, the first report message including a first request for bandwidth for the transmission of first data from the CNU, transmitting, by the FCU via the coaxial cable, a gate message to the CNU indicating an assignment of bandwidth for the transmission of the first data, and prior to receiving the first data at the FCU from the CNU via the coaxial cable using the assigned bandwidth, transmitting a second report message from the FCU to an OLT, the second report message including a second request for bandwidth for the transmission of the first data from the FCU.

In one embodiment, the second report message is transmitted at a time such that a receipt of a second gate message by the FCU from the OLT in response to the second report message is received proximate to a time that the first data is received by the FCU from the CNU. In one example, the time of transmission of the second report message is determined based on a delay from a time of receipt of the first report message by the FCU. In one embodiment, the transmission of the second report message prior to receiving the first data is dependent on the determined class of service of the first data.

Further with respect to the present invention, an FCU is provided, which includes a coax line terminal (CLT) that is configured for communication with a CNU via a coaxial cable, wherein the communication includes a receipt of a first report message from the CNU, the first report message including a first request for bandwidth for the transmission of first data from the CNU, and an ONU that is configured for communication with an OLT via an optical cable, the ONU including a multipoint control protocol (MPCP) module that is configured to initiate a transmission, prior to receiving the first data at the FCU using bandwidth assigned via a first gate message transmitted from the CLT to the CNU, of a second report message from the ONU to the OLT, the second report message including a second request for bandwidth for the transmission of the first data from the ONU to the OLT.

To illustrate the various features of the present invention, reference is made first to FIG. 1, which illustrates an example of a point-to-multipoint communication network that incorporates bridged FCUs of the present invention. As illustrated, the point-to-multipoint network includes a single OLT 110 that communicates with a plurality of FCUs 130-*n* via a PON. The illustrated PON includes splitter(s) 120, which enable a single optical fiber feeder cable to be split into multiple optical fiber drop cables for the individual FCUs 130-*n*.

Each FCU 130-*n* can interface with an EPoC domain that provides further distribution of traffic to a plurality of downstream CNUs via coaxial cables. As would be appreciated, each of the EPoC domain can enable the communication of traffic between one of FCUs 130-*n* and a plurality of downstream CNUs using a defined protocol that can be based on time division duplexing (TDD), frequency division duplexing (FDD), or the like.

In one embodiment, FCUs 130-*n* can be configured to serve as a bridge between the PON side and the EPoC side of the access network. Accordingly, an FCU 130-*n* is coupled from the PON side of the access network to an optical fiber cable, and from the EPoC side of the access network to a coaxial cable. In one embodiment, FCUs 130-*n* include a coaxial media converter (CMC) 112 that allows PON to EPoC bridging and conversion. In one example, FCU 130-*n* includes a first physical layer device (PHY) for PON encoding and a second PHY for EPoC encoding.

In general, bridged FCUs 130-*n* internetwork the optical distribution network with the coaxial distribution network, simultaneously creating two distinct media access control (MAC) domains. As will be described in greater detail below, an ONU within an FCU 130-*n* is connected to one MPCP control domain, and a CLT within an FCU 130-*n* is connected to another MPCP control domain. In operation, the ONU within the FCU 130-*n* is controlled and scheduled from OLT 110, while a CNU is controlled and scheduled from a CLT within the FCU 130-*n*.

Here, it should be noted that the PON domain can represent an EPON such as that defined by IEEE 802.3, GPON, BPON, xGPON, or NGPON defined by ITU-T, or the like. In general, the advantage of the PON is that it allows sharing of the fiber optic plant by multiple nodes. In the downstream direction, OLT 110 is configured to broadcast frames containing packets to FCUs 130-*n* that are responsible for extracting the particular packets that are destined for that particular EPoC domain, while in the upstream direction FCUs 130-*n* are designed to transmit traffic from the particular EPoC domain in a way to avoid collisions between the packets using, for example, a time division multiple access (TDMA) communication protocol.

Figure 2:
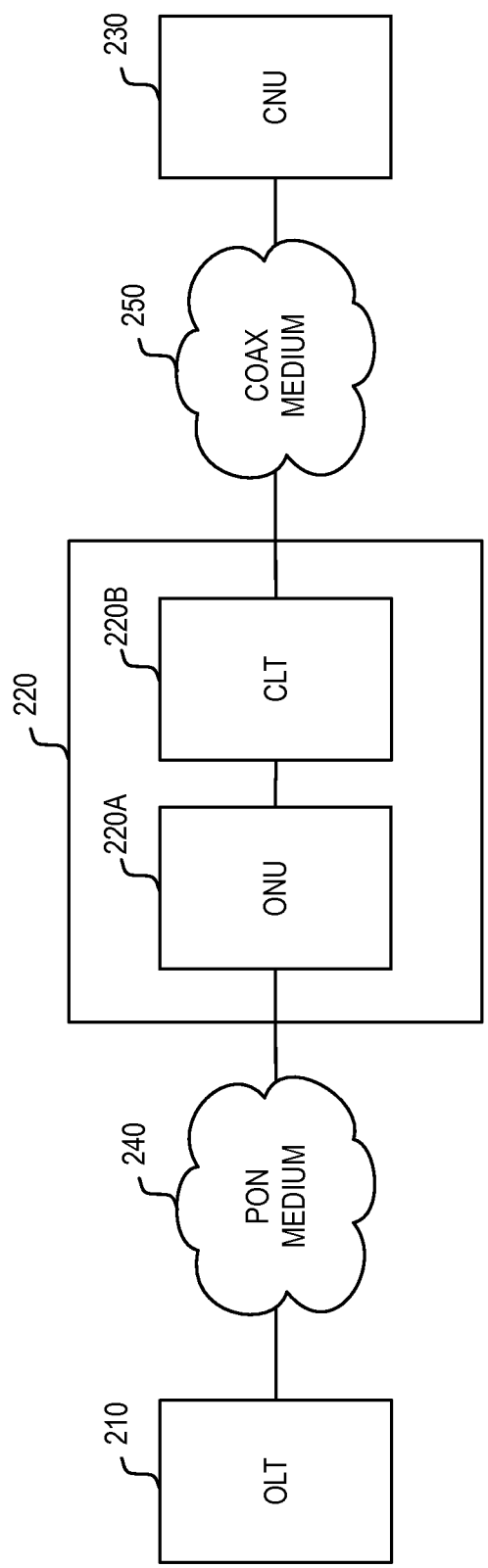
FIG. 2 illustrates an example embodiment of a bridged fiber coax unit (FCU) according to the present invention that interfaces with a PON domain and an Ethernet passive optical network over coaxial (EPOC) domain.

FIG. 2 illustrates an example embodiment of a bridged FCU according to the present invention that interfaces with a PON domain and an EPoC domain. As illustrated, FCU 220 includes ONU 220A and CLT 220B. ONU 220A can be configured to communicate with OLT 210 via PON medium 240, while CLT 220B can be configured to communicate with CNU 230 via a coaxial medium. As would be appreciated, both OLT 210 and ONU 220A can include PHYs that are configured to communicate over an optical fiber cabling medium, while CLT 220B and CNU 230 can include PHYs that are configured to communicate over a coaxial cabling medium.

Figure 3:
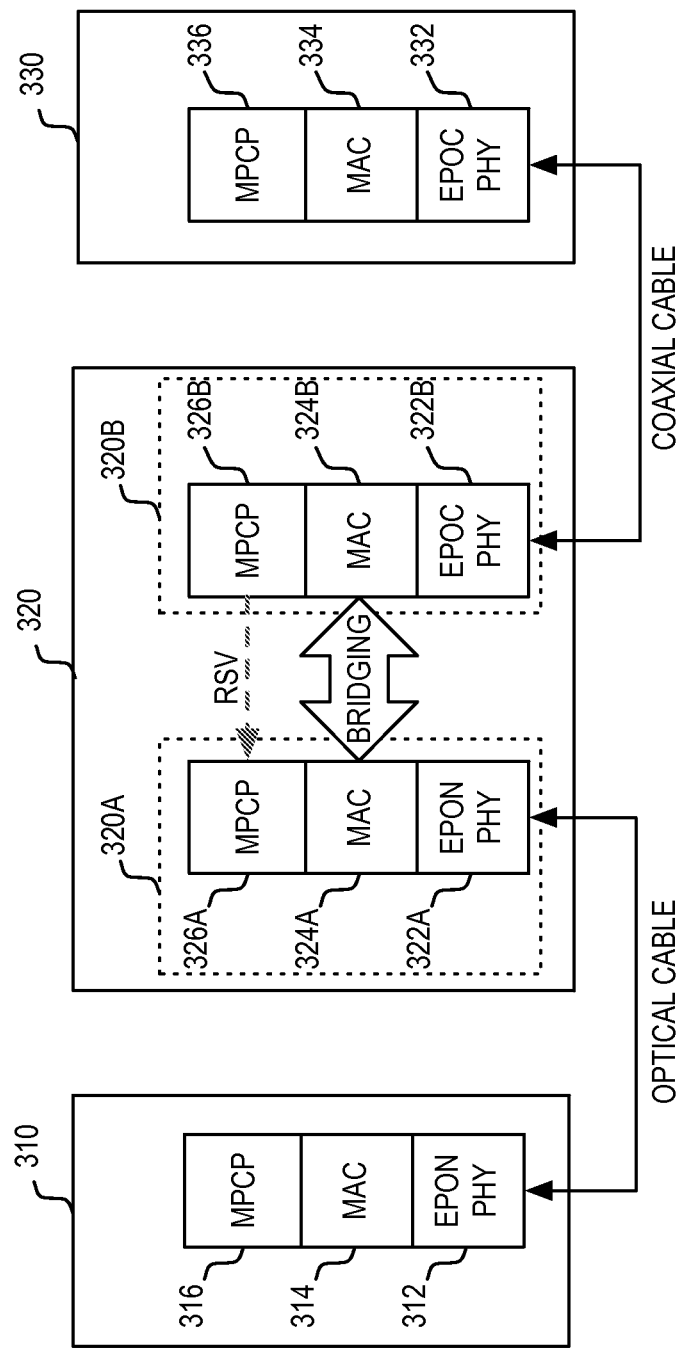
FIG. 3 illustrates a further example embodiment of a bridged FCU according to the present invention that interfaces with a PON domain and an EPOC domain.

FIG. 3 illustrates a further example embodiment of a bridged FCU according to the present invention that interfaces with a PON domain and an EPoC domain. As illustrated, FCU 320 includes ONU 320A and CLT 320B. ONU 320A can be configured to communicate with OLT 310 via optical fiber cabling, while CLT 320B can be configured to communicate with CNU 230 via coaxial cabling.

As further illustrated, the first MPCP control domain exists between OLT 310, which includes EPON PHY 312, MAC 314 and MPCP 316, and ONU 320A, which includes EPON PHY 322A, MAC 324A and MPCP 326A. In this arrangement, OLT 310 can perform discovery and registration of various FCUs. The second MPCP control domain exists between CLT 320B, which includes EPoC PHY 322B, MAC 324B and MPCP 326B, and CNU 330, which includes EPoC PHY 332, MAC 334 and MPCP 336. In this arrangement, CLT 320B can perform discovery and registration of various CNUs.

In a network such as that illustrated in FIG. 3, frames originating at CNU 330 that are to be transmitted upstream to OLT 310 would cross two separate MPCP scheduling domains. As noted, the second MPCP scheduling domain would enable the upstream transmission of a frame across the EPoC domain, while the first MPCP scheduling domain would enable the subsequent upstream transmission of the frame across the PON network.

In general, a frame that is received by CNU 330 at an ingress user port would undergo classification to determine the correct logical link on which to transmit the frame across the EPoC domain. Associating the frame with the correct EPoC network logical link enables FCU 320 to provide a configured quality of service (QoS) for that link. Once determined, CNU 330 would place the frame in a queue associated with the logical link until that logical link is scheduled for transmission by MPCP 326B. Once the frame is received at a coax service port at CLT 320B and provided to ONU 320A, ONU 320A can then determine how to forward the frame across the PON domain based on another classification operation. Again, ONU 320A would perform a classification to determine the correct logical link on which to transmit the frame across the PON domain. Once determined, ONU 320A would place the frame in a queue associated with the logical link until that logical link is scheduled for transmission by MPCP 316.

In the present invention, it is recognized that the transmission of frames upstream across two separate MPCP control domains would incur significant latency as the DBA latency is doubled. It is a feature of the present invention that an FCU can use grant information generated for downstream transmission to a CNU to initiate a generation of a report message for upstream transmission to an OLT. Significantly, the transmission of the report message upstream from the FCU to the OLT would occur prior to receiving the upstream data arriving at the FCU from the CNU.

To illustrate this feature of the present invention, consider the example of FIG. 3. When a frame is received by CNU 330 at an ingress user port, the class of traffic can be identified and the frame can be added to a class-based buffer. A report message is then generated by MPCP 336 in CNU 330 for transmission to MPCP 326B in CLT 320B of FCU 320.

Based on the received report message, MPCP 326B can then determine whether or not to grant bandwidth to CNU 330 based on a DBA process. When the grant decision is made at MPCP 326B, the granted length that has been allocated to CNU 330 can also be added to a report queue (e.g., class-based buffer counter) of MPCP 326A in ONU 320A of FCU 320. At this point, it should be noted that the actual data has not yet been received by CLT 320B from CNU 330. Rather, the transmission of a gate message from CLT 320B to CNU 330 is a communication of allocated bandwidth that can be used by CNU 330 for the upstream transmission of data in the future.

In the present invention, it is recognized that the second DBA process between OLT 310 and ONU 320A can be initiated prior to the receipt of actual upstream data by CLT 320B from CNU 330. In that regard, the earlier initiation of the second DBA process serves to reduced the overall latency of upstream data that crosses two separate MPCP control domains. Here, it should be noted that the earlier initiation of the second DBA process can occur only for particular classes of traffic, particular types of data, particular data flows, etc. that warrant the benefits of reduced latency.

In one embodiment, the granted length can be applied to the report queue with a time delay relative to the gate message transmitted from CLT 320B to CNU 330. This time delay can be chosen such that a grant message received by ONU 320A from OLT 310 is optimized to align with the arrival of upstream data at CLT 320B from CNU 330, thereby minimizing latency. In one embodiment, the time delay can be determined based on known or discovered relative latency in the DBA processes of the two MPCP control domains. Further, the time delay can be adaptive to ensure proper alignment of grant messages and upstream data at FCU 320.

In the present invention, it is recognized that the particular mechanism used to initiate the transmission of a report message by ONU 320A prior to the receipt of upstream data at CLT 320B can vary depending on the particular implementation of ONU 320A and CLT 320B. In one embodiment where a defined physical interface exists between ONU 320A and CLT 320B, a reservation (RSV) signal line can be defined such that ONU 320A can signal a need for ONU 320A to request bandwidth for data prior to the actual receipt of the data at CLT 320B. This would enable a report message to be generated prior to the actual addition of data into a queue (or buffer) of ONU 320A. Here, it should be noted that a defined physical interface can exist where ONU 320A and CLT 320B are implemented on separate ICs, modules, line cards, etc. within an FCU enclosure.

In other embodiments, ONU 320A and CLT 320B can be integrated such that MPCP 326A and MPCP 326B are logically separated. In such an embodiment, a physical signal line need not exist between MPCP 326A and MPCP 326B. Rather, the communication between the logically separated MPCP 326A and MPCP 326B can be implemented using register-based or software-based messaging. As would be appreciated, the particular signaling mechanism used would be implementation dependent and would not depart from the scope of the present invention.

As would further be appreciated, the principles of the present invention are not dependent on the particular interfaces or protocols used to predicatively request bandwidth. For example, the principles of the present invention are not dependent on defined report and gate messaging. In other embodiments, the principles of the present invention can be applied to other protocols such as cDOCSIS. Moreover, the principles of the present invention can be applied to embodiments that analyze packet contents. For example, an FCU can be configured to request additional bandwidth if it detects a packet that is marked yellow. In other examples, an FCU can be configured to request additional bandwidth based on the protocol type and expected data burst associated with it.

Figure 4:
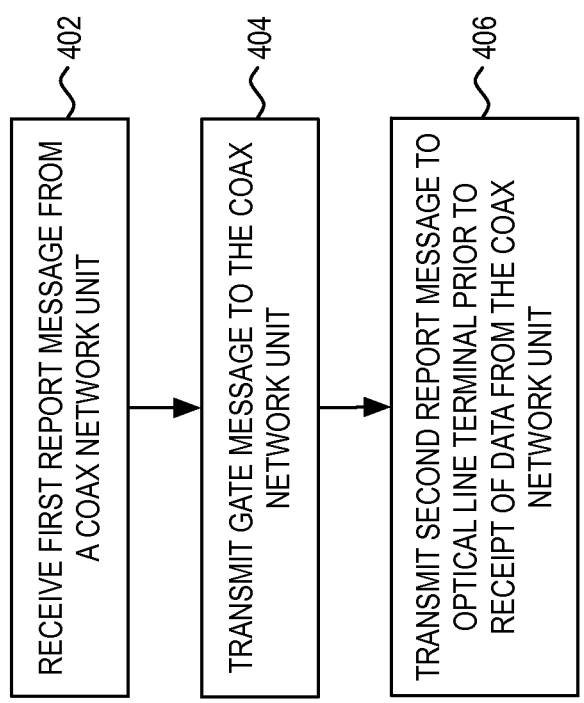
FIG. 4 illustrates an example of a process of the present invention.

Having described a framework of the present invention, reference is now made to the flowchart of FIG. 4, which illustrates an example process of the present invention. As illustrated, the process begins at step 402 where a report message is received by an FCU from a CNU. In the context of a DBA process example, the report message represents a request for bandwidth. As noted above, the particular mechanism by which a need for bandwidth is identified can vary. Any mechanism within a protocol packet or a data packet that provides an indication of a class of service, type of data, future bandwidth needs, etc. can be used as an indication of bandwidth needs by the downstream device.

At step 404, the indication of a bandwidth need by the CNU can be used in the generation and transmission of a gate message to the CNU. In the context of a DBA process example, the gate message is an explicit indication of a bandwidth allocation that enables the CNU to transmit data upstream. In other embodiments, an explicit indication in the form of a gate message need not be required. For example, an indication of bandwidth received at an intermediary device can be an alert of additional traffic that can be predicted or expected.

At step 406, the expected future arrival of data at the FCU can be used to trigger the transmission of a second report message from the FCU to the OLT prior to receipt of data from the CNU. Here, it is recognized that the particular timing of the transmission of the second report message would be implementation dependent. What is significant is that its transmission is not dependent on the receipt of the upstream data at the FCU. Rather, the transmission of the second report message from the FCU to the OLT prior to receipt of data from the CNU enables a pre-fetching of a bandwidth allocation from the OLT.

As has been described, a mechanism is provided by the present invention that enables a reduction of latency in data networking. The principles of the present invention can be applied to any data networking context that implements a form of dynamic bandwidth allocation.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:
1. A fiber coax unit, comprising:
   a first physical layer device that is configured for communication with a coax network unit via a coaxial cable, wherein the communication includes a receipt of a first report message from the coax network unit, the first report message including a first request for bandwidth for a transmission of first data from the coax network unit;

a second physical layer device that is configured for communication with an optical line terminal via an optical cable; and a controller that is configured to:

transmit a first gate message to the coax network unit via the first physical layer device, the first gate message assigning bandwidth for transmission of the first data from the coax network unit to the fiber coax unit;

receive, at a first time, the first data from the coax network unit in response to the first gate message; and transmit, at a second time prior to the first time at which the first data is received in response to the first gate message, a second report message to the optical line terminal via the second physical layer device, the second report message including a second request for bandwidth for a transmission of the first data from the fiber coax unit to the optical line terminal, wherein transmitting the second report message at the second time is configured to cause the optical line terminal to process the second request during at least a portion of a same time frame during which the fiber coax unit is waiting to receive the first data from the coax network unit in response to the first gate message.

2. The fiber coax unit of claim 1, wherein the controller is included within a coax line terminal portion of the fiber coax unit.

3. The fiber coax unit of claim 1, wherein the controller is included within an optical network unit portion of the fiber coax unit.

4. The fiber coax unit of claim 1, further comprising a reservation line between a coax line terminal portion of the coax fiber unit and an optical network unit portion of the fiber coax unit that is configured for signaling of the initiation of transmission.

5. The fiber coax unit of claim 1, wherein the controller is configured to determine the second time at which to transmit such that a receipt of a second gate message by the fiber coax unit from the optical line terminal in response to the second report message is proximate to the first time at which the first data is received by the fiber coax unit from the coax network unit.

6. The fiber coax unit of claim 5, wherein the controller is configured to determine the second time at which to transmit the second report message based on a delay from a time of receipt of the first report message by the fiber coax unit.

7. The fiber coax unit of claim 1, wherein the transmission of the second report message prior to receiving the first data at the fiber coax unit is dependent on a class of service of the first data.

8. A method performed by a fiber coax unit, comprising:

receiving, by the fiber coax unit via a coaxial cable, a first report message from a coax network unit, the first report message including a first request for bandwidth for a transmission of first data from the coax network unit;

transmitting, by the fiber coax unit via the coaxial cable, a first gate message to the coax network unit, the first gate message assigning bandwidth for transmission of the first data from the coax network unit to the fiber coax unit;

receiving, at the fiber coax unit, at a first time, the first data from the coax network unit via the coaxial cable in response to the first gate message; and transmitting, at a second time prior to the first time at which the first data is received in response to the first gate message, a second report message to the optical line terminal via the second physical layer device, the second report message including a second request for bandwidth for a transmission of the first data from the fiber coax unit to the optical line terminal, wherein transmitting the second report message at the second time is configured to cause the optical line terminal to process the second request during at least a portion of a same timeframe during which the fiber coax unit is waiting to receive the first data from the coax network unit in response to the first gate message.

9. The method of claim 8, wherein the fiber coax unit is configured to determine the second time at which to transmit such that a receipt of a second gate message by the fiber coax unit from the optical line terminal in response to the second report message is received proximate to a time that the first data is received by the fiber coax unit from the coax network unit.

10. The method of claim 9, wherein the second time at which to transmit is determined based on a delay from a time of receipt of the first report message by the fiber coax unit.

11. The method of claim 8, further comprising determining a class of service based on the first report message.

12. The method of claim 11, wherein the transmission of the second report message prior to receiving the first data is dependent on the determined class of service.

13. A fiber coax unit, comprising:

a coax line terminal that is configured for communication with a coax network unit via a coaxial cable, wherein the communication includes a receipt of a first report message from the coax network unit, the first report message including a first request for bandwidth for a transmission of first data from the coax network unit; and an optical network unit that is configured for communication with an optical line terminal via an optical cable, the optical network unit including a multipoint control protocol module that is configured to:

transmit, at a first time, a first gate message to the coax network unit via the first physical layer device, the first gate message assigning bandwidth for transmission of the first data from the coax network unit to the fiber coax unit;

receive, at a first time, the first data from the coax network unit in response to the first gate message; and transmit, at a second time prior to the first time at which the first data is received in response to the first gate message, a second report message to the optical line terminal via the second physical layer device, the second report message including a second request for bandwidth for a transmission of the first data from the fiber coax unit to the optical line terminal, wherein transmitting the second report message at the second time is configured to cause the optical line terminal to process the second request during at least a portion of a same timeframe during which the fiber coax unit is waiting to receive the first data from the coax network unit in response to the first gate message.

14. The fiber coax unit of claim 13, further comprising a reservation line between the coax line terminal and the optical network unit, the reservation line being configured for signaling of a future transmission of the first data to the coax line terminal.

15. The fiber coax unit of claim 13, wherein the second report message is transmitted at a time such that a receipt of a second gate message by the optical network unit from the optical line terminal in response to the second report message is received proximate to a time that the first data is received by the coax line terminal from the coax network unit.

16. The fiber coax unit of claim 13, wherein the transmission of the second report message prior to receiving the first data at the coax line terminal is dependent on a class of service of the first data.

17. The fiber coax unit of claim 6, wherein transmitting the second report message at the second time is configured to align receipt of a second gate message by the fiber coax unit from the optical line terminal with the arrival of the first data from the coax network unit.

18. The fiber coax unit of claim 17, wherein the delay is determined based on known relative latency in a bandwidth allocation process between at least one of:

an optical network unit and the fiber coax unit; or the optical line terminal and the fiber coax unit.

19. The method of claim 10, wherein transmitting the second report message at the second time is configured to align receipt of a second gate message by the fiber coax unit from the optical line terminal with the arrival of the first data from the coax network unit.

20. The fiber coax unit of claim 13, wherein transmitting the second report message at the second time is configured to align receipt of a second gate message by the fiber coax unit from the optical line terminal with the arrival of the first data from the coax network unit.

21. A fiber coax unit, comprising:

a first physical layer device that is configured for communication with a coax network unit via a coaxial cable, wherein the communication includes a receipt of a first report message from the coax network unit, the first report message including a first request for bandwidth for a transmission of first data from the coax network unit;

a second physical layer device that is configured for communication with an optical line terminal via an optical cable; and a controller that is configured to initiate a transmission, prior to receiving the first data at the fiber coax unit from the coax network unit via the coaxial cable using bandwidth assigned via a first gate message, of a second report message from the fiber coax unit to the optical line terminal, the second report message including a second request for bandwidth for the transmission of the first data from the fiber coax unit to the optical line terminal, wherein the transmission of the second report message prior to receiving the first data at the fiber coax unit is dependent on a class of service of the first data.

22. A fiber coax unit, comprising:

a first physical layer device that is configured for communication with a coax network unit via a coaxial cable, wherein the communication includes a receipt of a first report message from the coax network unit, the first report message including a first request for bandwidth for a transmission of first data from the coax network unit;

a second physical layer device that is configured for communication with an optical line terminal via an optical cable; and a controller that is configured to initiate a transmission, prior to receiving the first data at the fiber coax unit from the coax network unit via the coaxial cable using bandwidth assigned via a first gate message, of a second report message from the fiber coax unit to the optical line terminal, the second report message including a second request for bandwidth for the transmission of the first data from the fiber coax unit to the optical line terminal, wherein the second report message is transmitted at a time such that a receipt of a second gate message by the fiber coax unit from the optical line terminal in response to the second report message is received proximate to a time that the first data is received by the fiber coax unit from the coax network unit.

23. The fiber coax unit of claim 22, wherein the controller is configured to determine a time of transmission of the second report message based on a delay from a time of receipt of the first report message by the fiber coax unit.

* * * * *